(12) United States Patent
Mohtar et al.

(10) Patent No.: US 9,845,723 B2
(45) Date of Patent: Dec. 19, 2017

(54) ADJUSTABLE-TRIM CENTRIFUGAL COMPRESSOR, AND TURBOCHARGER HAVING SAME

(71) Applicant: Honeywell International Inc., Morristown, NJ (US)

(72) Inventors: Hani Mohtar, Lorraine (FR); Pascal Villemin, Girancourt (FR); Stephane Pees, Meurthe-et-Moselle (FR); Aurelien Tingaud, Thaon les vosges (FR); Alain Lombard, Vosges (FR); Damien Marsal, Golbey (FR)

(73) Assignee: Honeywell International Inc., Morris Plains, NJ (US)

( * ) Notice: Subject to any disclaimer, the term of this patent is extended or adjusted under 35 U.S.C. 154(b) by 372 days.

(21) Appl. No.: 14/551,218

(22) Filed: Nov. 24, 2014

(65) Prior Publication Data

US 2016/0146099 A1 May 26, 2016

(51) Int. Cl.
 *F04D 29/46* (2006.01)
 *F02B 37/22* (2006.01)
 (Continued)

(52) U.S. Cl.
 CPC ............ *F02B 37/22* (2013.01); *F02C 6/12* (2013.01); *F02C 7/042* (2013.01); *F04D 25/024* (2013.01);
 (Continued)

(58) Field of Classification Search
 CPC .. F02B 37/22; F02B 37/24; F02C 6/12; F02C 7/042; F04D 25/024; F04D 27/0253;
 (Continued)

(56) References Cited

U.S. PATENT DOCUMENTS 3,042,291 A * 7/1962 Greenwald ........... F04D 29/464
 415/126
3,972,644 A * 8/1976 Johnson ................ F01D 17/165
 415/151
(Continued)

FOREIGN PATENT DOCUMENTS

DE 102010026176 A1 1/2012
DE 102011121996 B4 6/2013
(Continued)

OTHER PUBLICATIONS

Extended Search Report in EPO application No. EP15195061.5 dated Mar. 24, 2016.

*Primary Examiner* — Kenneth Bomberg
*Assistant Examiner* — Brian Delrue
(74) *Attorney, Agent, or Firm* — John C. James

(57) ABSTRACT

A centrifugal compressor for a turbocharger includes an inlet-adjustment mechanism in an air inlet for the compressor, operable to move between an open position and a closed position in the air inlet. The inlet-adjustment mechanism includes a variable-geometry conical mechanism comprising a plurality of vanes that in the closed position collectively form a frusto-conical inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conical mechanism. The vanes in the open position are pivoted radially outwardly so as to increase the trailing edge inner diameter of the inlet member and thereby increase the effective diameter of the air inlet at the inducer portion.

5 Claims, 8 Drawing Sheets

(51) Int. Cl.
*F04D 25/02* (2006.01)
*F04D 27/02* (2006.01)
*F02C 6/12* (2006.01)
*F04D 29/42* (2006.01)
*F02C 7/042* (2006.01)
*F02B 37/24* (2006.01)

(52) U.S. Cl.
CPC ..... *F04D 27/0253* (2013.01); *F04D 29/4213* (2013.01); *F04D 29/462* (2013.01); *F04D 29/464* (2013.01); *F02B 37/24* (2013.01); *F05D 2220/40* (2013.01)

(58) Field of Classification Search
CPC .. F04D 29/4213; F04D 29/462; F04D 29/464; F05D 2220/40
USPC .................................. 415/160, 151, 159, 163
See application file for complete search history.

(56) References Cited

U.S. PATENT DOCUMENTS

| | | | | |
|---|---|---|---|---|
| 4,684,319 A * | 8/1987 | Sasaki | ................... | F01D 17/165 415/164 |
| 4,726,744 A * | 2/1988 | Arnold | ................... | F01D 17/165 415/164 |
| 5,454,225 A * | 10/1995 | Sumser | ................... | F01D 9/045 415/166 |
| 6,129,511 A * | 10/2000 | Salvage | ................... | F01D 17/02 415/1 |
| 6,715,288 B1 * | 4/2004 | Engels | ................... | F01D 17/143 415/158 |
| 7,083,379 B2 * | 8/2006 | Nikpour | ............... | F04D 27/0246 415/144 |
| 7,117,827 B1 * | 10/2006 | Hinderks | ................ | F02B 75/00 123/197.1 |
| 8,850,813 B2 * | 10/2014 | Lotterman | .............. | F01D 25/24 123/562 |
| 9,683,484 B2 * | 6/2017 | Tingaud | ................... | F02B 37/24 |
| 2003/0026694 A1 * | 2/2003 | Groskreutz | ........... | F01D 17/165 415/164 |
| 2005/0091978 A1 * | 5/2005 | Sumser | ................... | F01D 17/16 60/608 |
| 2009/0104024 A1 * | 4/2009 | Kay | ........................ | F01D 5/147 415/161 |
| 2009/0290977 A1 * | 11/2009 | Dilovski | ................. | F01D 5/046 415/146 |
| 2010/0196145 A1 * | 8/2010 | Lombard | ................ | F01D 17/14 415/148 |
| 2011/0116911 A1 * | 5/2011 | Garrett | ................. | F01D 17/143 415/157 |
| 2012/0186247 A1 * | 7/2012 | Marques | ................ | F01D 9/026 60/605.1 |
| 2014/0093364 A1 * | 4/2014 | Narehood | ............... | F01D 9/026 415/191 |
| 2014/0308110 A1 * | 10/2014 | Houst | ..................... | F02B 37/22 415/1 |
| 2016/0131145 A1 * | 5/2016 | Mohtar | ................. | F01D 17/141 417/380 |

FOREIGN PATENT DOCUMENTS

| | | | | |
|---|---|---|---|---|
| DE | 102013003418 A1 * | 8/2014 | ........... | F04D 29/464 |
| DE | EP 2981699 B1 * | 5/2017 | | |
| EP | 3023644 A1 * | 5/2016 | ............. | F02B 37/22 |
| EP | 3054123 A1 * | 8/2016 | ........... | F01D 17/141 |
| EP | 3043045 A3 * | 11/2016 | ........... | F01D 17/146 |
| GB | 1159314 A * | 7/1969 | ............... | F02K 1/08 |
| GB | WO 2004048755 A1 * | 6/2004 | ........... | F01D 17/167 |
| IT | EP 2423449 A1 * | 2/2012 | ........... | F01D 17/165 |
| WO | 2013074503 A1 | 5/2013 | | |
| WO | WO 2013074503 A1 * | 5/2013 | ............. | F02B 37/22 |

* cited by examiner

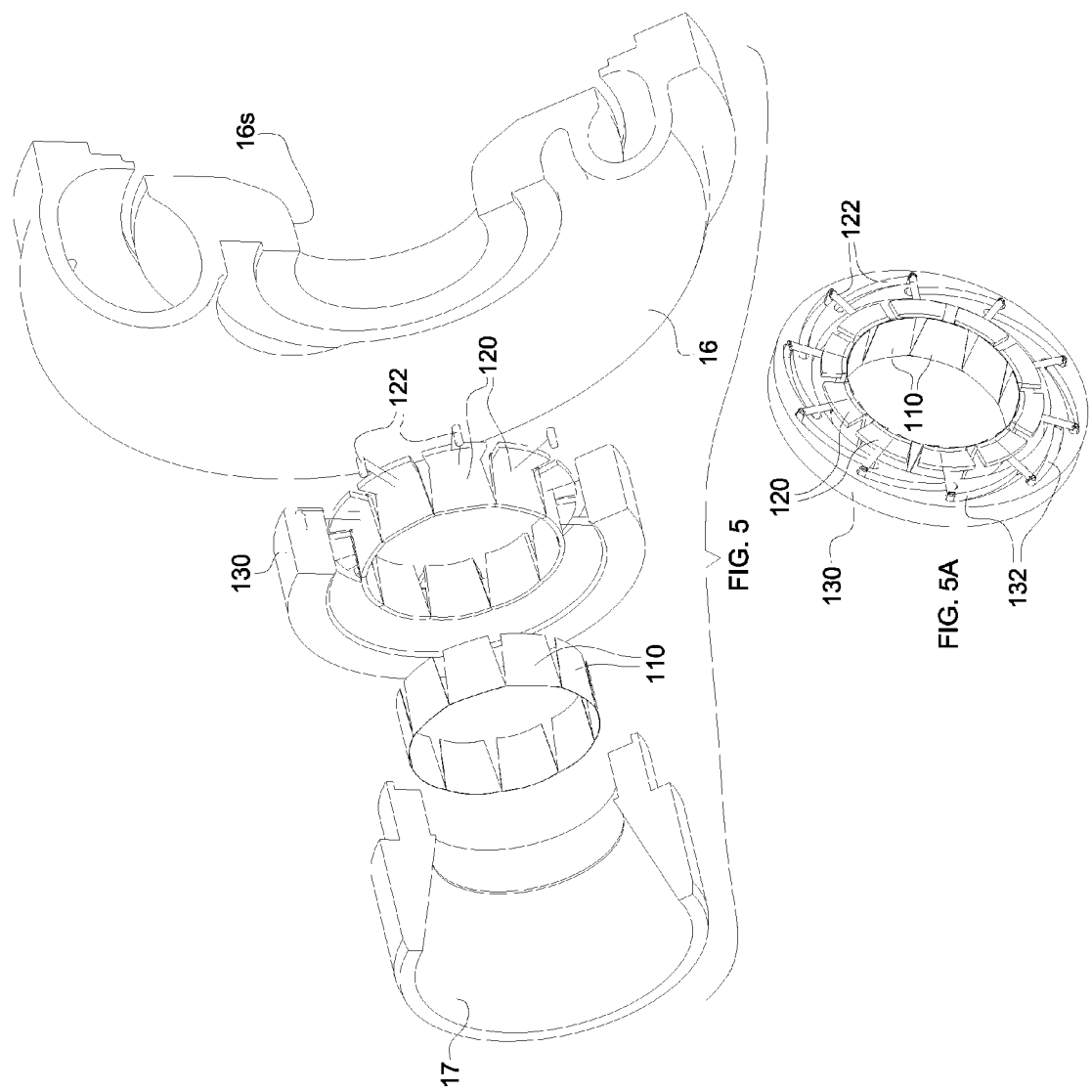

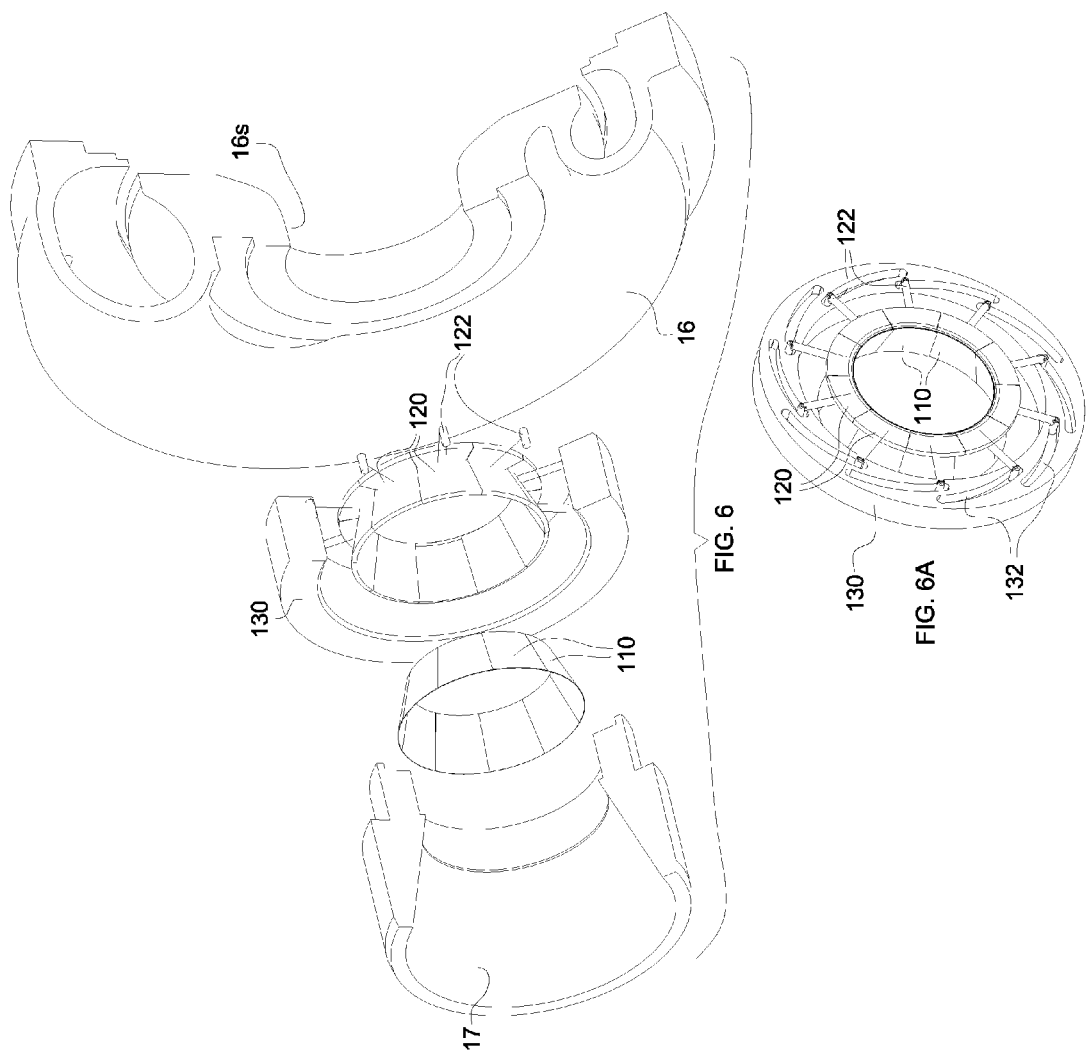

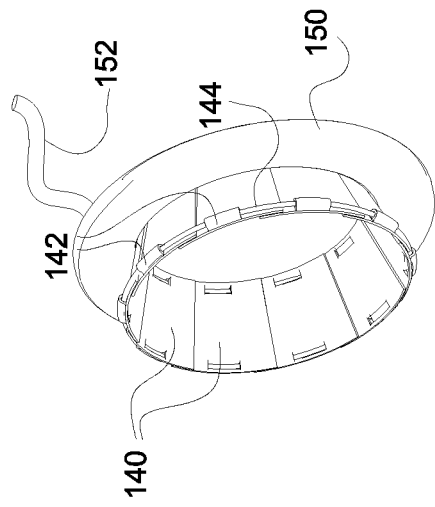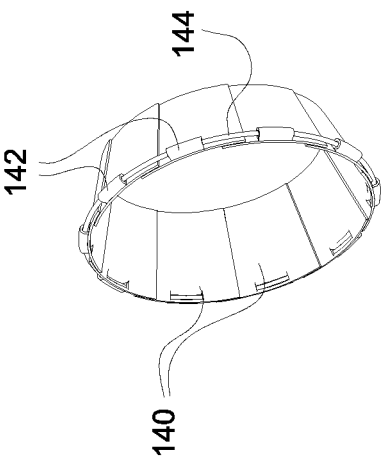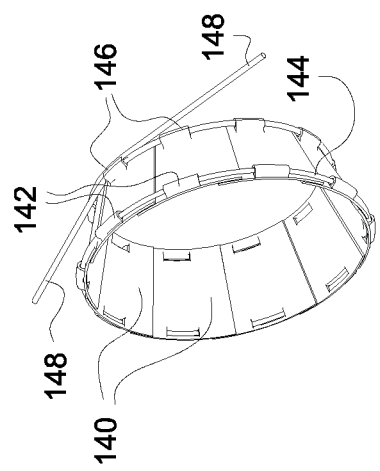

ADJUSTABLE-TRIM CENTRIFUGAL COMPRESSOR, AND TURBOCHARGER HAVING SAME

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio). One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the inducer portion of the compressor wheel, the compressor housing further defining a volute for receiving compressed air discharged generally radially outwardly from the compressor wheel, the air inlet having an inner surface that extends for an axial length along a downstream direction, followed by a compressor inlet-adjustment mechanism disposed in the air inlet, followed by a shroud surface that is adjacent to outer tips of the blades of the compressor wheel.

The compressor inlet-adjustment mechanism is movable between an open position and a closed position, the inlet-adjustment mechanism comprising a variable-geometry conical mechanism comprising a plurality of vanes that pivot about their leading edges. In the closed position the vanes collectively form a frusto-conical inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conical mechanism. The vanes in the open position are pivoted radially outwardly so as to increase the trailing edge inner diameter of the inlet member and thereby increase the effective diameter of the air inlet at the inducer portion.

The variable-geometry conical mechanism in one embodiment includes a plurality of vane-moving members disposed on radially outer sides of the vanes, and an actuator member engaged with the vane-moving members. The actuator member is rotatable so as to pivot the vane-moving members radially inwardly and radially outwardly about their leading edges for moving the variable-geometry conical mechanism between the closed and open positions respectively.

The vane-moving members can include control arms mounted at trailing edges of the vane-moving members, and the actuator member can comprise a rotatable ring having cam slots in which the control arms are engaged such that rotational movement of the actuator member translates into radial movement of the control arms and thus pivotal movement of the vane-moving members about their leading edges.

Alternatively, the vane-moving members can be omitted and the vanes can include guides mounted at the trailing edges of the part-conical vanes, the guides being configured for an actuator member in the form of a drawstring (for example, a metal spring wire) that is threaded through the guides and is pulled so as to exert a radially inward force on the vanes to cause pivotal movement of the vanes about their leading edges.

As still another alternative, instead of the guides and drawstring, an inflatable bladder can be mounted about the vanes at their trailing edges. The bladder can be inflated (for example, with air bled off from the compressor) to exert a radially inward force on the vanes to cause pivotal movement of the vanes about their leading edges.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 5 is an exploded view of a portion of the turbocharger of FIGS. 1-4, showing the inlet-adjustment mechanism in the open position;

FIG. 5A is a perspective view of the inlet-adjustment mechanism viewed in a direction looking generally upstream with respect to the air flow direction, with the inlet-adjustment mechanism in the open position;

FIG. 6 is view similar to FIG. 5, with the inlet-adjustment mechanism in the closed position;

FIG. 6A is a view similar to FIG. 5A, with the inlet-adjustment mechanism in the closed position;

FIG. 6B is similar to FIG. 5B, with the variable-geometry conical mechanism in the closed position;

FIG. 6C is similar to FIG. 5C, with the variable-geometry conical mechanism in the closed position; and FIG. 6D is similar to FIG. 5D, with the variable-geometry conical mechanism in the closed position.

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
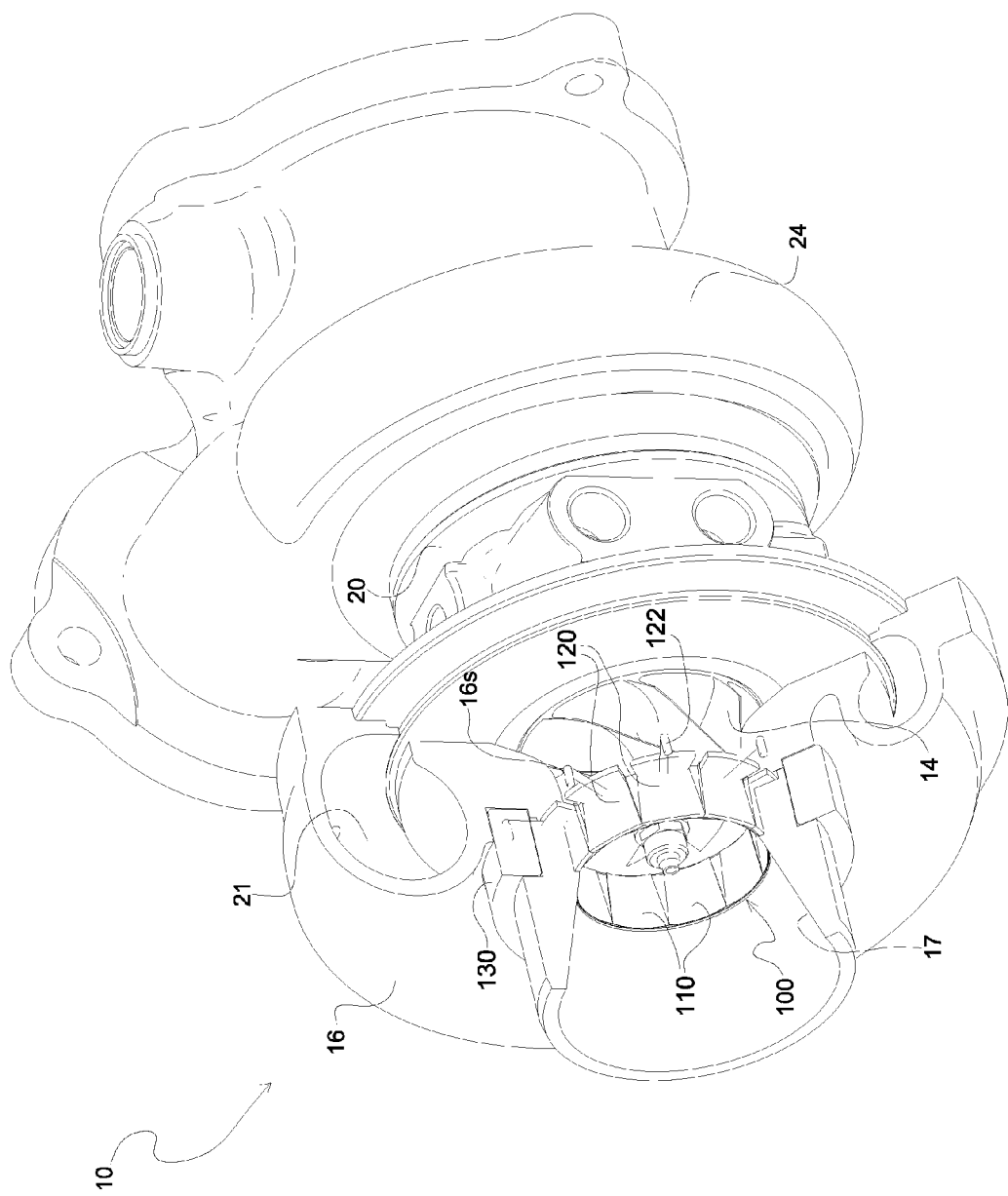
FIG. 1 is a perspective view of a turbocharger, with a portion of the compressor housing cut away to show internal details, in accordance with one embodiment of the invention, wherein the inlet-adjustment mechanism is in the open position.
Figure 2:
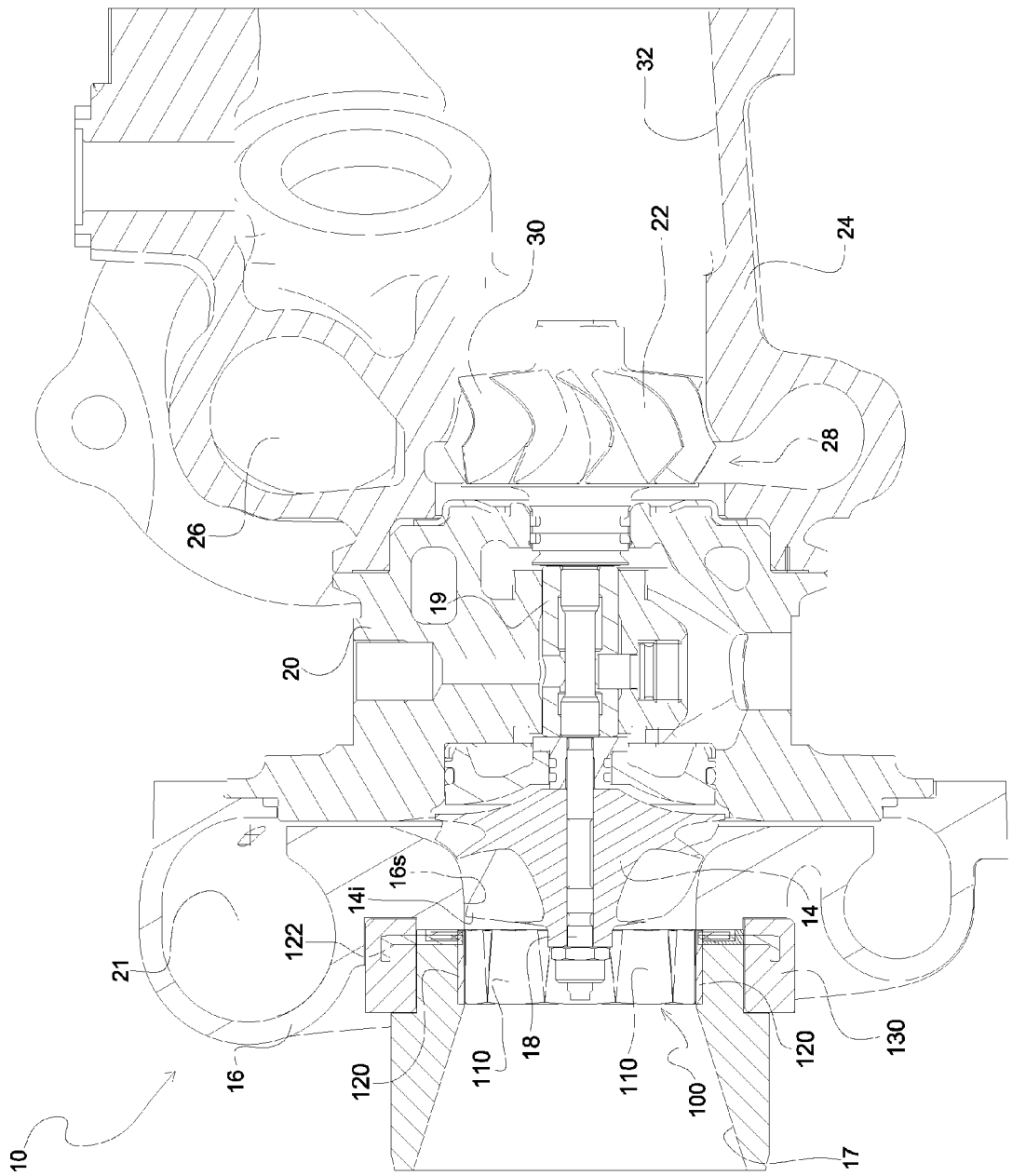
FIG. 2 is an axial cross-sectional view of the turbocharger of FIG. 1, with the inlet-adjustment mechanism in the open position.

A turbocharger 10 in accordance with one embodiment of the invention is illustrated in perspective view in FIG. 1, and in cross-sectional view in FIG. 2. The turbocharger comprises a compressor 12 having a compressor wheel or impeller 14 mounted in a compressor housing 16 on one end of a rotatable shaft 18. The compressor housing defines an air inlet 17 for leading air generally axially into the compressor wheel 14. The shaft 18 is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The compressor housing 16 defines a shroud surface 16s that is closely adjacent to the radially outer tips of the compressor blades. The shroud surface 16s defines a curved contour that is generally parallel to the contour of the compressor wheel. At the inlet to the inducer portion 14i of the compressor wheel, the shroud surface 16s has a diameter that is slightly greater than the diameter of the inducer portion 14i.

The turbocharger further includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

Figure 3:
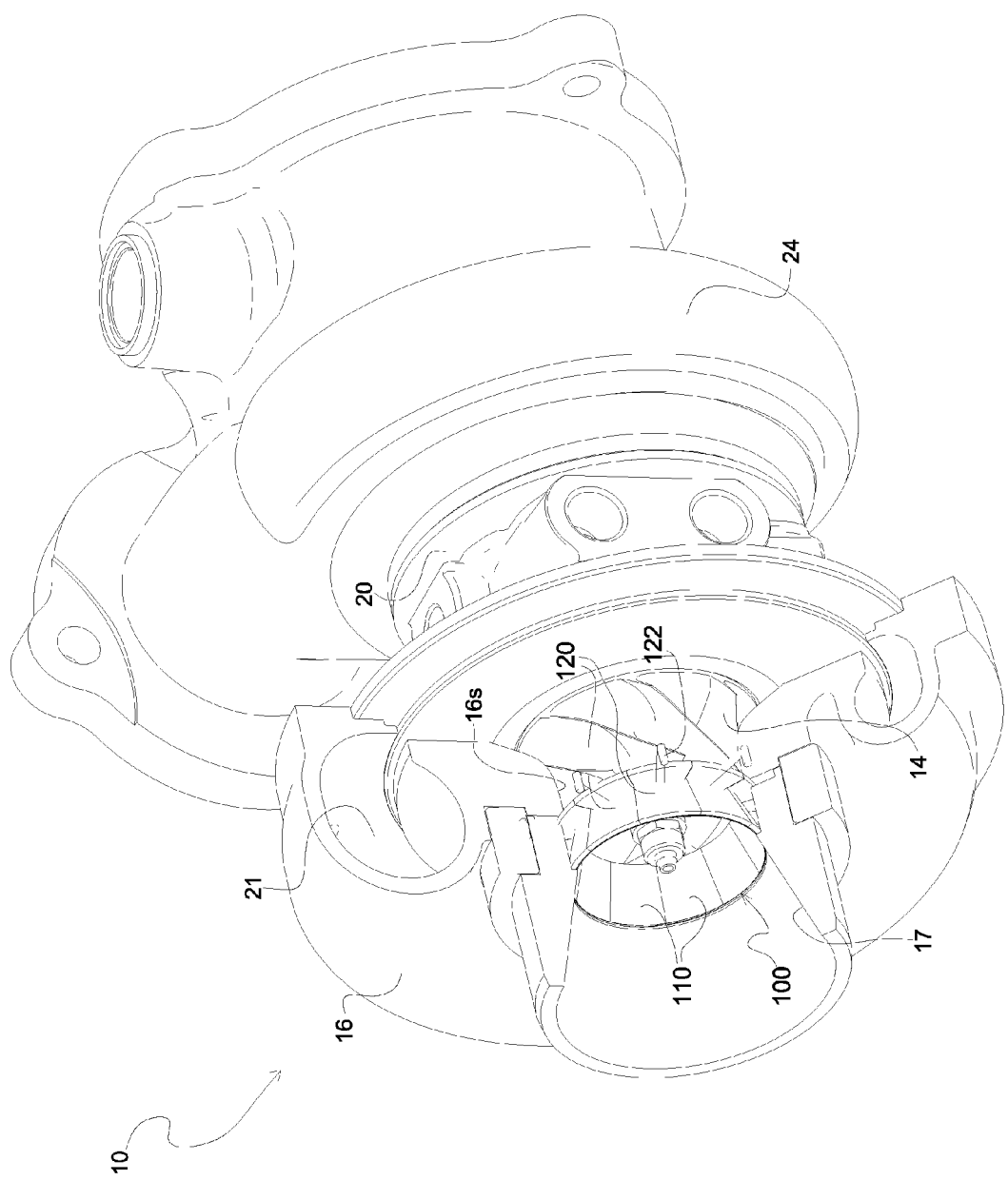
FIG. 3 is a view similar to FIG. 1, but with the inlet-adjustment mechanism in the closed position.
Figure 4:
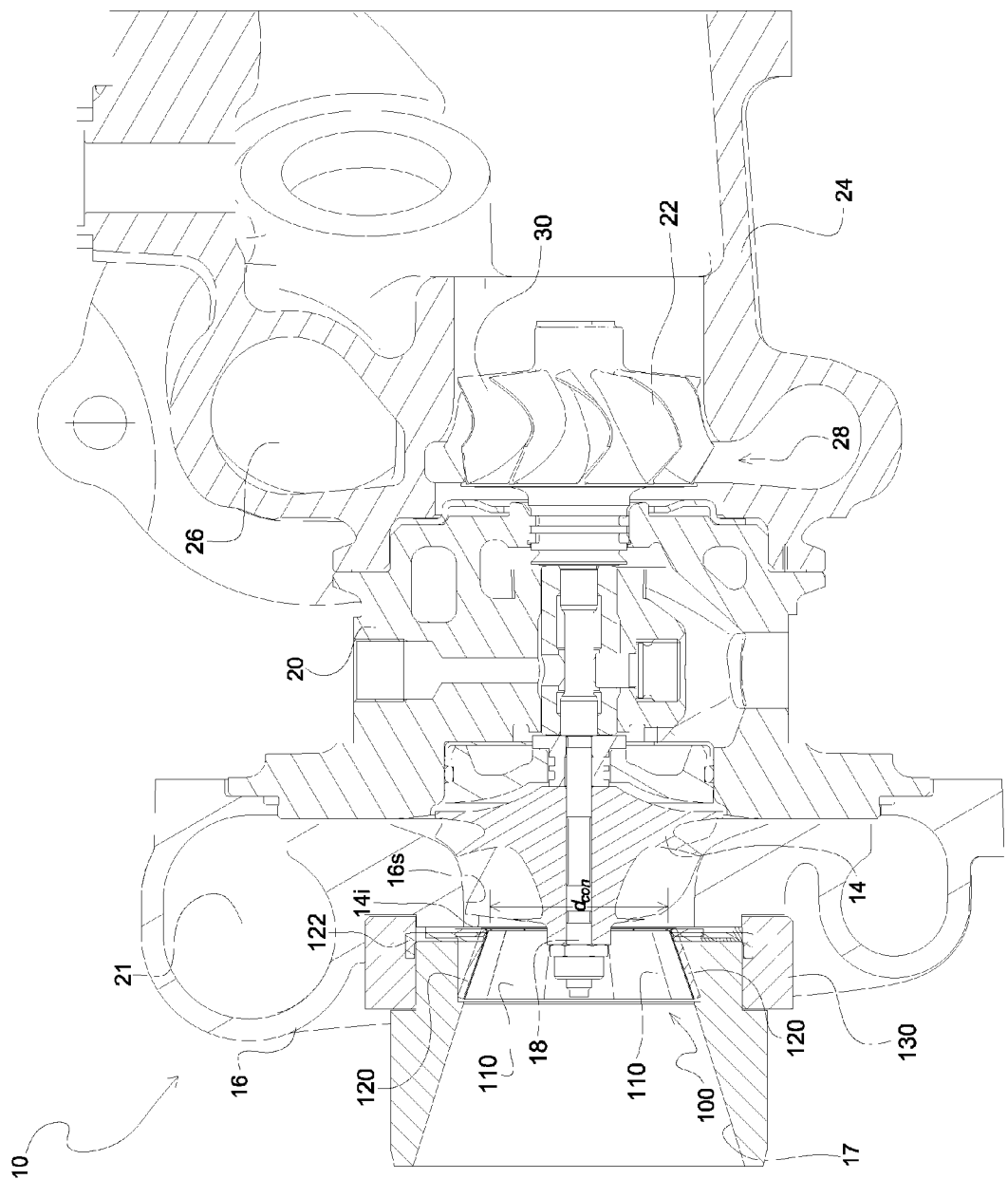
FIG. 4 is view similar to FIG. 2, but with the inlet-adjustment mechanism in the closed position.

In accordance with the invention, the compressor of the turbocharger includes an inlet-adjustment mechanism 100 disposed in the air inlet 17 of the compressor housing just upstream of the shroud surface 16s and inducer portion 14i. The mechanism 100 is movable between an open position (FIGS. 1, 2, and 5) and a closed position (FIGS. 3, 4, and 6). The inlet-adjustment mechanism comprises variable-geometry conical mechanism. The variable-geometry conical mechanism in the closed position has a trailing edge inner diameter $d_{con}$ (FIG. 4) that is smaller than an inner diameter of the shroud surface 16s of the compressor housing at the inducer portion of the compressor wheel, and the variable-geometry conical mechanism in the closed position is positioned such that the effective diameter of the air inlet at the inducer portion is determined by the inner diameter $d_{con}$ of the variable-geometry conical mechanism. The variable-geometry conical mechanism in the open position is moved so as to increase the trailing edge inner diameter such that an effective diameter of the air inlet at the inducer portion is determined by the shroud surface 16s.

The variable-geometry conical mechanism 100 is spaced upstream of the inducer 14i of the compressor wheel 14 by as small a distance as practicable so as to maximize the effect of the orifice on the effective diameter of the air inlet at the inducer portion.

More particularly, the variable-geometry conical mechanism 100 comprises a plurality of part-conical vanes 110 that in the closed position (FIGS. 3 and 4) collectively form a frusto-conical inlet member. The mechanism includes a plurality of vane-moving members 120 disposed on radially outer sides of the vanes 110, and an actuator member 130 engaged with the vane-moving members. The actuator member is movable so as to urge the vane-moving members 120 radially inwardly and radially outwardly for moving the variable-geometry conical mechanism between the closed and open positions respectively. It will be understood that when radially inward/outward movement is described herein, it is not restricted to a purely radial movement, but encompasses any motion of the vanes that has a radial component effective for closing or opening the variable-geometry conical mechanism. More specifically, the vane-moving members 120 are arranged to pivot about their leading edges (i.e., the edges farthest upstream with respect to the air flow through the compressor inlet 17), and likewise the vanes 110 also pivot about their leading edges.

In the illustrated embodiment as best seen in FIG. 5, when the variable-geometry conical mechanism is open, there are triangular-shaped gaps between the edges of adjacent vanes 110, and similarly there are triangular-shaped gaps between edges of adjacent vane-moving members 120. The vanes 110 are circumferentially shifted in position relative to the positions of the vane-moving members 120 so that the gaps between the vanes are not aligned with the gaps between the vane-moving members. In this manner the vane-moving members cover the gaps between the vanes and thereby help prevent air from passing through the gaps.

The vane-moving members 120 can include control arms 122 extending radially outwardly from the trailing edges of the vane-moving members, and the actuator member 130 can comprise a rotatable ring having generally circumferentially extending cam slots 132 (FIGS. 5A and 6A). In particular, the control arms 122 have end portions that extend generally axially and are engaged in the cam slots 132. Each cam slot 132 changes radius from one end to the other end of the slot, such that rotational movement of the actuator member translates into radial movement of the control arms and thus pivoting of the vane-moving members about their leading edges. The end of the slot at a larger radius corresponds to the open position of the inlet-adjustment mechanism (FIG. 5A) and the end at a smaller radius corresponds to the closed position (FIG. 6A). However, other arrangements for actuating the pivotal movement of the vanes 110 can be employed instead of the particular arrangement illustrated in the drawings.

Figure 5B:
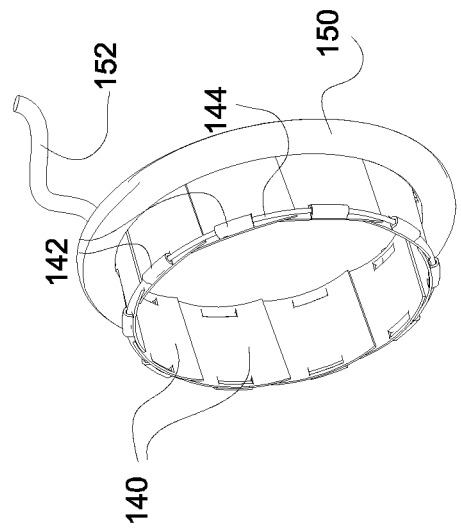
FIG. 5B is a perspective view of an alternative embodiment of a variable-geometry conical mechanism in the open position.

As illustrated in FIGS. 5B and 6B, the variable-geometry conical mechanism in accordance with a further embodiment includes overlapping vanes 140 of thin flexible material (e.g., thin metal, Hytrel, or the like) that overlap in the circumferential direction even when the mechanism is in the open position (FIG. 5A). The overlapping vanes 140 can be substituted for the vanes of the previous embodiment, such that there are still vane-moving members 120 substantially as described in the previous embodiment, disposed on radially outer sides of the overlapping vanes and pivotable about their leading edges for causing the overlapping vanes 140 to pivot about their leading edges. Alternatively, only the radially extending portions of the vane-moving members 120 can be provided, which can be attached directly to the trailing edge regions of the overlapping vanes 140, and can have control arms 122 engaged with the actuator member 130 as in the previous embodiment. Yet another variation is to provide the radially extending portions of the vane-moving members 120 as separate parts, i.e., not integrally formed with the axially extending portions of the vane-moving members, but arranged to exert radially inward force on the axially extending portions for closing the inlet-adjustment mechanism. Still another variation is to include such separately formed radially extending portions of the vane-moving members 120 but to omit the axially extending portions, and to arrange the radially extending portions to exert radially inward force directly on the vanes 140 for closing the mechanism. In these different variations, and as depicted in the drawings, the vanes 140 can include guides 142 at their leading edges, through which a metal wire 144 or the like is threaded circumferentially so that the array of vanes 140 is held together in a hoop arrangement by the metal wire and the vanes can pivot about the wire.

Figure 5C:
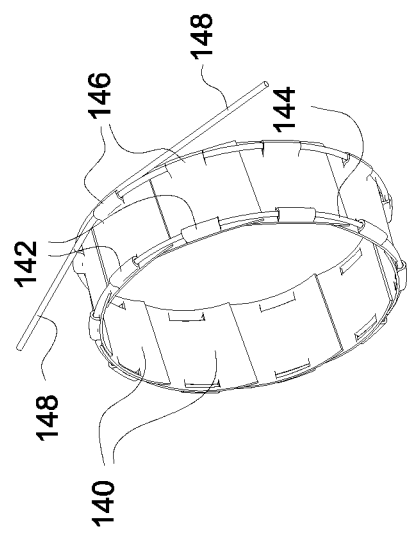
FIG. 5C is a perspective view of a further alternative embodiment of a variable-geometry conical mechanism in the open position.

A further embodiment is illustrated in FIGS. 5C and 6C. It is similar to the embodiment of FIGS. 5B and 6B in that it includes overlapping vanes 140 having leading-edge guides 142 and a wire 144 for the vanes to pivot about. The difference is that in the current embodiment there are also trailing-edge guides 146 mounted on the trailing-edge portions of the vanes, and a drawstring (e.g., a metal wire) 148 is threaded through the guides, with the two ends of the drawstring 148 extending out in opposite directions so that when the two ends are pulled in opposite directions, the circumference of the loop portion of the drawstring becomes smaller (FIG. 6C). Thus, the drawstring 148 is the actuator for the overlapping vanes 140, such that the vane-moving members of the previous embodiments are not needed.

Figure 5D:
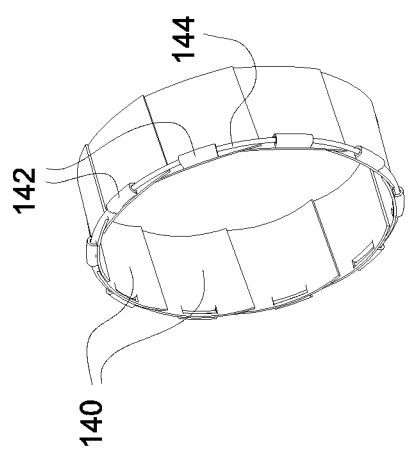
FIG. 5D is a perspective view of yet another embodiment of a variable-geometry conical mechanism in the open position.

A still further embodiment is shown in FIGS. 5D and 6D. It is similar to the embodiments of FIGS. 5B-C and 6B-C in that it includes overlapping vanes 140 having leading-edge guides 142 and a wire 144 for the vanes to pivot about. In the current embodiment, however, instead of a drawstring actuator, there is an inflatable bladder 150 mounted about the trailing-edge region of the overlapping vanes 140, with a supply line 152 connected to a source of pressurized fluid (e.g., pressurized air bled off from the compressor). Inflating the bladder causes radially inward pressure on the vanes 140 so that they pivot about the wire 144 at the leading edges of the vanes.

At low flow rates (e.g., low engine speeds), the inlet-adjustment mechanism of the present invention can be placed in the closed position of FIGS. 3, 4, 6, and 6A-D. This can have the effect of reducing the effective inlet diameter into the inducer portion of the compressor wheel and thus of increasing the flow velocity into the wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At higher flow rates, the inlet-adjustment mechanism can be opened partially (not illustrated) or fully (FIGS. 1, 2, 5, and 5A-D), depending on the particular operating point of the compressor. When the inlet-adjustment mechanism described herein is fully opened, the compressor regains its high-flow performance and choke flow essentially as if the inlet-adjustment mechanism were not present and as if the compressor had a conventional inlet matched to the wheel diameter at the inducer portion of the wheel.

Many modifications and other embodiments of the inventions set forth herein will come to mind to one skilled in the art to which these inventions pertain having the benefit of the teachings presented in the foregoing descriptions and the associated drawings. For example, while the inlet-adjustment mechanism of the present disclosure is described as a variable-geometry conical mechanism, it will be understood that the term "conical" merely connotes a generally tapering structure that becomes smaller in diameter along the flow direction approaching the compressor wheel. There is no strict requirement that the structure be purely or even generally conical. As an example, the vanes forming the variable-geometry conical mechanism could be curved along the axial direction. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the compressor wheel, the compressor housing further defining a volute for receiving compressed air discharged generally radially outwardly from the compressor wheel, the air inlet having an inner surface that extends for an axial length along a downstream direction, followed by a compressor inlet-adjustment mechanism disposed in the air inlet, followed by a shroud surface that is adjacent to outer tips of the blades of the compressor wheel;
the compressor inlet-adjustment mechanism being movable between an open position and a closed position, the inlet-adjustment mechanism comprising a variable-geometry conical mechanism comprising a plurality of vanes each extending along the downstream direction, from a leading edge to a trailing edge of the vane, the vanes in the closed position collectively forming a frusto-conical inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conical mechanism, the vanes in the open position being pivoted radially outwardly about the leading edges of the vanes so as to increase the trailing edge inner diameter of the inlet member and thereby increase the effective diameter of the air inlet at the inducer portion,
wherein the variable-geometry conical mechanism includes a plurality of vane-moving members each extending along the downstream direction, from a leading edge to a trailing edge of the vane-moving member, the vane-moving members being disposed on radially outer sides of the vanes, one said vane-moving member for each said vane, and an actuator member engaged with the vane-moving members, wherein each of the vane-moving members pivots about the leading edge of the vane-moving member, and the actuator member is movable so as to pivot the vane-moving members radially inwardly and radially outwardly for moving the variable-geometry conical mechanism between the closed and open positions respectively.

2. The turbocharger of claim 1, wherein the vane-moving members include control arms extending from the trailing edges of the vane-moving members, and the actuator member comprises a rotatable ring having generally circumferentially extending cam slots in which the control arms are engaged, each cam slot varying in radius in a circumferential direction of the actuator member such that rotational movement of the actuator member translates into radial movement of the control arms and thus pivotal movement of the vane-moving members.

3. A turbocharger, comprising:
a turbine housing and a turbine wheel mounted in the turbine housing and connected to a rotatable shaft for rotation therewith, the turbine housing receiving exhaust gas and supplying the exhaust gas to the turbine wheel;
a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the compressor wheel, the compressor housing further defining a volute for receiving compressed air discharged generally radially outwardly from the compressor wheel, the air inlet having an inner surface that extends for an axial length along a downstream direction, followed by a compressor inlet-adjustment mechanism disposed in the air inlet, followed by a shroud surface that is adjacent to outer tips of the blades of the compressor wheel;
the compressor inlet-adjustment mechanism being movable between an open position and a closed position, the inlet-adjustment mechanism comprising a variable-geometry conical mechanism comprising a plurality of vanes each extending along the downstream direction, from a leading edge to a trailing edge of the vane, the vanes in the closed position collectively forming a frusto-conical inlet member having a trailing edge inner diameter that is smaller than an inner diameter of the shroud surface of the compressor housing at the inducer portion of the compressor wheel such that an effective diameter of the air inlet at the inducer portion is determined by the trailing edge inner diameter of the variable-geometry conical mechanism, the vanes in the open position being pivoted radially outwardly about the leading edges of the vanes so as to increase the trailing edge inner diameter of the inlet member and thereby increase the effective diameter of the air inlet at the inducer portion; and
a plurality of leading-edge guides mounted respectively at the leading edges of the vanes, and a wire threaded through the leading-edge guides, the vanes pivoting about the wire.

4. The turbocharger of claim 3, further comprising a plurality of trailing-edge guides mounted respectively at the trailing edge of the vanes, and a drawstring threaded through the trailing-edge guides, with end portions of the drawstring extending out in opposite directions from the trailing-edge guides such that pulling on the end portions in opposite directions causes the circumference of the drawstring to be reduced so as to pivot the vanes inwardly about the wire at the leading edges of the vanes.

5. The turbocharger of claim 3, further comprising an inflatable bladder mounted about the trailing edges of the vanes, inflation of the bladder exerting radially inward pressure on the vanes to cause the vanes to pivot inwardly.

\* \* \* \* \*